United States Patent [19]
Buhler et al.

[11] Patent Number: 6,104,704
[45] Date of Patent: Aug. 15, 2000

[54] METHODS AND APPARATUS FOR GATHERING AND PROCESSING BILLING INFORMATION FOR INTERNET TELEPHONY

[75] Inventors: Gerhard Buhler, Little Silver; Bethany Scott Robinson, Lebanon, both of N.J.

[73] Assignee: AT&T Corp., New York, N.Y.

[21] Appl. No.: 08/821,280

[22] Filed: Mar. 20, 1997

[51] Int. Cl.[7] .................................................. H04M 15/00
[52] U.S. Cl. ...................... 370/252; 370/401; 370/546; 379/114; 379/127
[58] Field of Search .................................... 379/111, 112, 379/114, 115, 120, 121, 127, 130, 201, 219, 220, 221, 202, 207, 230, 100.04, 100.06, 100.03, 100.13, 100.15, 100.17, 144, 154; 370/389, 392, 352, 401, 252, 546; 705/21, 30, 34; 709/203

[56] References Cited

U.S. PATENT DOCUMENTS

| | | | |
|---|---|---|---|
| 5,608,786 | 3/1997 | Gordon | 370/401 |
| 5,745,556 | 4/1998 | Ronen | 379/114 |
| 5,867,495 | 2/1999 | Elliot et al. | 370/352 |

FOREIGN PATENT DOCUMENTS

WO 97/28628  7/1997  WIPO .

OTHER PUBLICATIONS

C. Yang, "INETPhone: Telephone Services and Servers on Internet," http://ds.internic.net/rfc/rfc1789.txt, pp. 1–6, Apr. 1995.

*Primary Examiner*—Ricky Ngo

[57] ABSTRACT

A billing method and server for gathering and processing billing information for Internet telephony connections. Originating and terminating clients and Internet Service Providers ("ISPs") are identified by the server from information contained in digital packets. The digital packets also identify the beginning and ending time of the connection, as well as enhancements chosen for the particular connection, and choices of information to be displayed during the connection. The billing server transmits selected information to each client during the connection, such information including packet routing, packet density, elapsed time of connection, and available and selected enhancements. The server constructs a billing detail for each connection and constructs a billing record for each ISP and client over a specific time period. The server periodically forwards each billing record to its associated ISP.

16 Claims, 5 Drawing Sheets

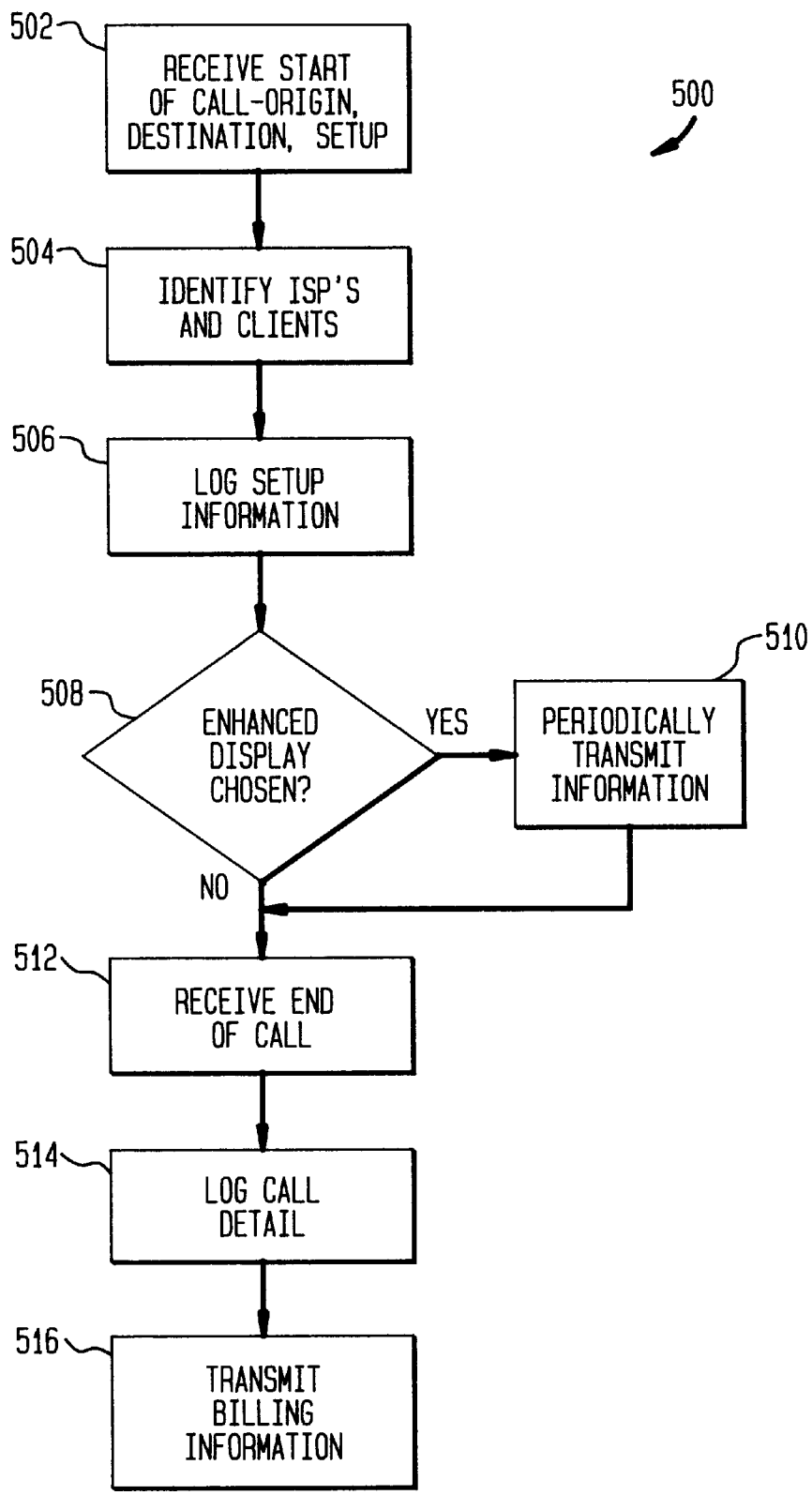

METHODS AND APPARATUS FOR GATHERING AND PROCESSING BILLING INFORMATION FOR INTERNET TELEPHONY

FIELD OF THE INVENTION

The present invention relates generally to improvements in the field of Internet telephony, and more particularly to methods and apparatus for gathering and processing connection information and providing flexible billing services for Internet telephony.

BACKGROUND OF THE INVENTION

As the growth of the Internet has continued and accelerated, more and more uses are being found for the Internet. One of the more recent uses is for Internet telephony, which may be defined as two-way voice communication between two or more persons using the digital packet network provided by the Internet. A significant potential exists for widespread use of Internet telephony. This is particularly true if reliable, high-quality service can be provided. A way to facilitate the provision of special enhancements for telephony would be to charge differential pricing, with a higher price for Internet telephone connections having such enhancements. Alternatively, enhanced features such as voice enhancements or increased packet density, or, in other words, the packets per unit time used for the call, could be made available for selection at the beginning of an Internet telephone connection and billed at a special rate. Differential pricing for Internet telephony offers the potential of a significant savings over conventional telephone connections, especially international telephone connections, while furnishing the provider with a revenue stream sufficient to allow the development of new and enhanced services.

One obstacle to differential pricing for enhanced services related to Internet telephony is that present Internet billing methods lack flexible provisions for allocating costs. At present, each user who connects to the Internet through a commercial provider typically pays for his or her own connect time, without regard to the specific activities being undertaken during the connection, and without regard to who initiated the connection. In an Internet telephone connection, both parties pay for their own connection time. This is in contrast to the cost allocation typical in conventional telephony, wherein the calling party pays for the call except where different arrangements are specifically made, for example, such as collect or 800-number calling where the called party pays for the charges connected with the call. Among other issues, users of Internet telephony are not likely to be willing to pay increased per-minute charges for enhanced services unless they can be assured that they will not be required to pay for unwanted calls. Users of standard telephone services may not willingly adopt Internet telephony unless the billing arrangement is one they are accustomed to and they are able to get the quality of service that they desire.

Furthermore, the typical Internet telephony billing arrangement does not include techniques for taking advantage of the user interfaces available with Internet telephony end devices to provide sophisticated services unique to Internet telephony and not typically available with traditional telephony service products.

Therefore, there exists a need to address such problems and for a billing server for Internet telephony which will provide flexible billing options and enhanced billing services and information.

SUMMARY OF THE PRESENT INVENTION

The present invention may suitably address the needs outlined above as well as others which are apparent from consideration of the present invention as a whole. In one aspect of the present invention, a billing server for Internet telephony is provided. This billing server would preferably (1) process and, in part, record, call detail information in real time, (2) interact with customers' client software in real time, and (3) provide access to some or all of the call detail information. The billing server could be suitably used to provide billing services to customers.

In another aspect of the present invention, a "cost-causer pays" billing service for Internet telephony is provided. This service provides parity with customary billing and payment arrangements for traditional telephone calls, and counteracts the resistance of many called parties to paying for unsolicited Internet telephony calls received from an unknown calling party.

According to another aspect of the present invention, "a called party pays" billing service for Internet telephony is provided. This service also provides parity with customary billing and payment arrangements for traditional telephone calls, such as collect calls and "800" number calls.

In another aspect of the present invention, a "call information" billing service is provided. This service is unique to Internet telephony and is not found in traditional telephony service products. This service makes use of the sophisticated user interface available with Internet telephony end devices to display call information in real-time using graphics, sound or both. The service can be built to include call statistics and other non-traditional call detail information. For example, the geographic path taken by the call packets may be displayed on the customer display. Alternatively, the geographic location of the participants in a conference call may be displayed on a map on the customer display.

Perhaps the biggest commercial benefit provided through the individual or combined offering of the above discussed capabilities is that Internet telephony calls can be made to have a billable quality. There is a perception that Internet telephony is "free" although Internet users normally have to pay fees to an Internet Access Provider ("IAP"). "Free" Internet telephony then treats voice packets the same as other data packets transmitted over the Internet. By providing additional service enhancements for packetized voice calls, or Internet telephony calls, the service provider can charge for these services. It is also important to note that the owner of the billing server can provide billing services to the customers of other IAPs due to the unique nature of packet telephony. As long as the billing server is part of the packet network, the service architecture can be used to process call detail information in real time. It is a simple matter for an IAP to construct packets containing information about a connection and transmit those packets to another IAP containing a billing server, no matter where on the network the billing server is located; however, appropriate security and authentication techniques must be employed to prevent abuse of such information, such as fraud, harassment or the like.

A more complete understanding of the present invention, as well as further features and advantages of the invention will be apparent from the following Detailed Description and the accompanying drawings.

BRIEF DESCRIPTION OF THE DRAWINGS

FIG. 5 is a flowchart illustrating one suitable method of operation of a billing server according to the teachings of the present invention.

DETAILED DESCRIPTION

Figure 1:
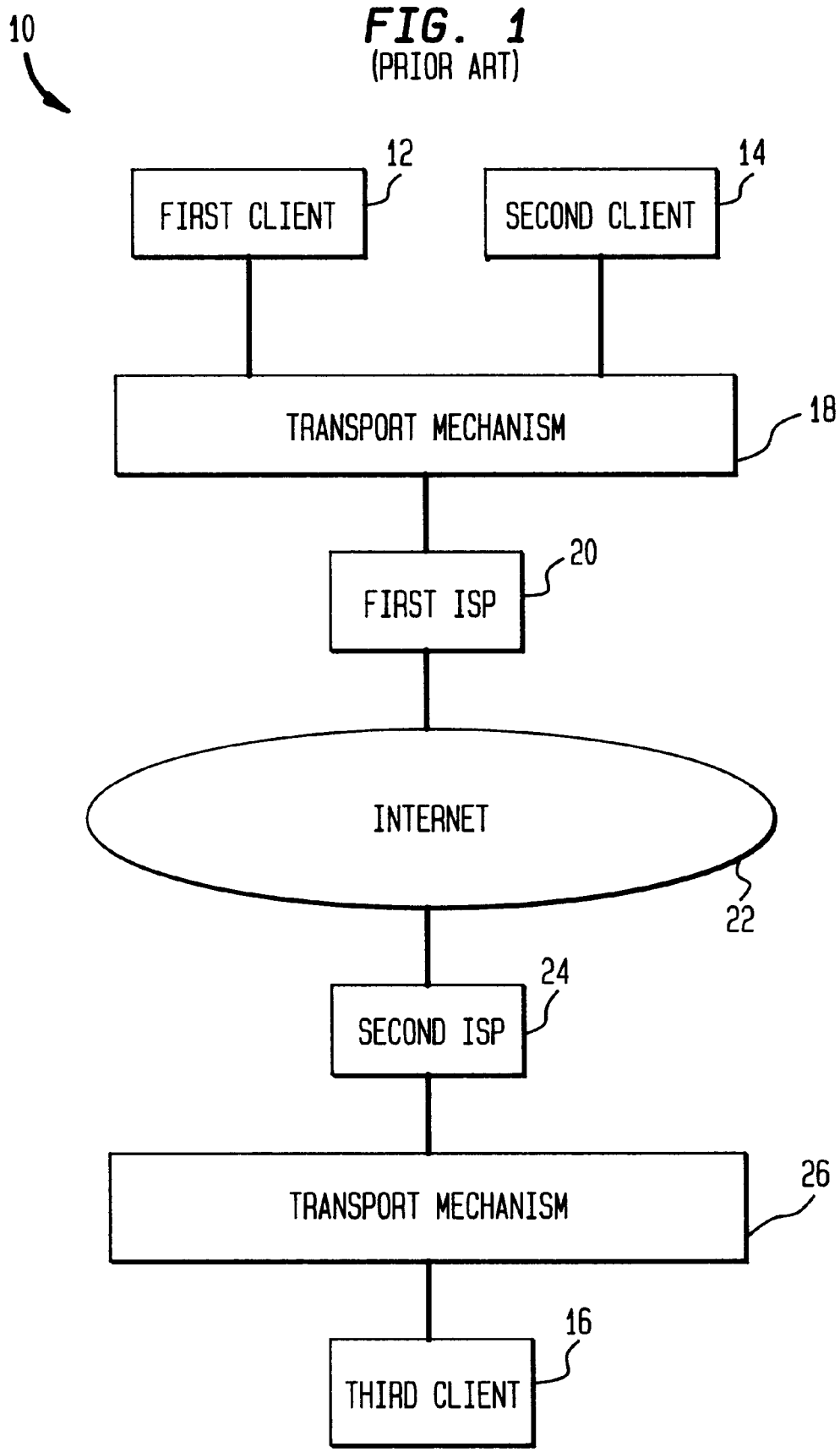
FIG. 1 is a functional model of a communication system of the prior art.

FIG. 1 illustrates a communication system 10 according to the prior art. Communication system 10 is illustrated as providing information transfer capabilities between computers or clients 12, 14 and 16; however, communication system 10 also includes layers capable of providing communication without the use of computers. Representative first, second and third clients 12, 14 and 16, respectively, are shown to illustrate various communication possibilities that the communication system 10 provides.

The communication system 10 includes a transport mechanism 18. The transport mechanism 18 can be an ISDN line, a standard dialup modem line, cable, a LAN or WAN, a wireless channel, or any of a number of other communication channels or mechanisms. Depending on the design choices made, transport mechanism 18 can employ packet transmission, or can employ a mechanism other than packet transmission. Although transport mechanism 18 is shown as serving client computers 12 and 14, transport method 18 may also be suitable for voice, video, and audio communication depending on the particular design choices made.

Because of their proximity, the users of clients 12 and 14 may or may not use a packet switching network for voice telephony. They may choose to communicate by voice directly through the transport mechanism 18. In order to communicate with more remote clients and users, however, the clients 12 and 14 are both conveniently connected as part of a packet switching network.

Clients 12 and 14 both employ a first Internet service Provider ("ISP") 20 to access the Internet. Using the packet transmission capability provided by ISP 20, the clients 12 and 14 are able to communicate with client 16, and with other clients connected to other ISPs, through the Internet 22. Client 12, for example, can communicate with client 16, which employs second ISP 24 as its Internet Service Provider, by routing packets through the Internet. Client 16 communicates with ISP 24 through transport mechanism 26, which, like transport mechanism 18, can be employed with any of a number of different protocols.

Communication system 10 as shown in FIG. 1 is unable to provide billing information for Internet telephony in the manner which is presently typical of the way conventional telephone services are billed. Each user of one of the clients 12, 14 and 16 pays for access to transport system 18 or 26 and for access to ISP 20 or ISP 24. Each user pays for his or her own connection, without regard to who initiated the connection. This is in contrast to billing options provided for conventional long-distance voice telephony, in which the originator of the call is usually billed for the call, and in which other billing options exist, such as collect and 800-number calling.

Each of the ISPs 20 and 24 communicates with its own clients and bills its own users based on a flat rate or on a per-minute charge, regardless of who initiated the connection or what use is being made of the connection. Moreover, the communication system 10 is unable to provide customers making Internet voice telephony connections with information about time, length, and duration of calls, and the identity of a called or calling party, as is common with conventional voice telephony.

Figure 2:
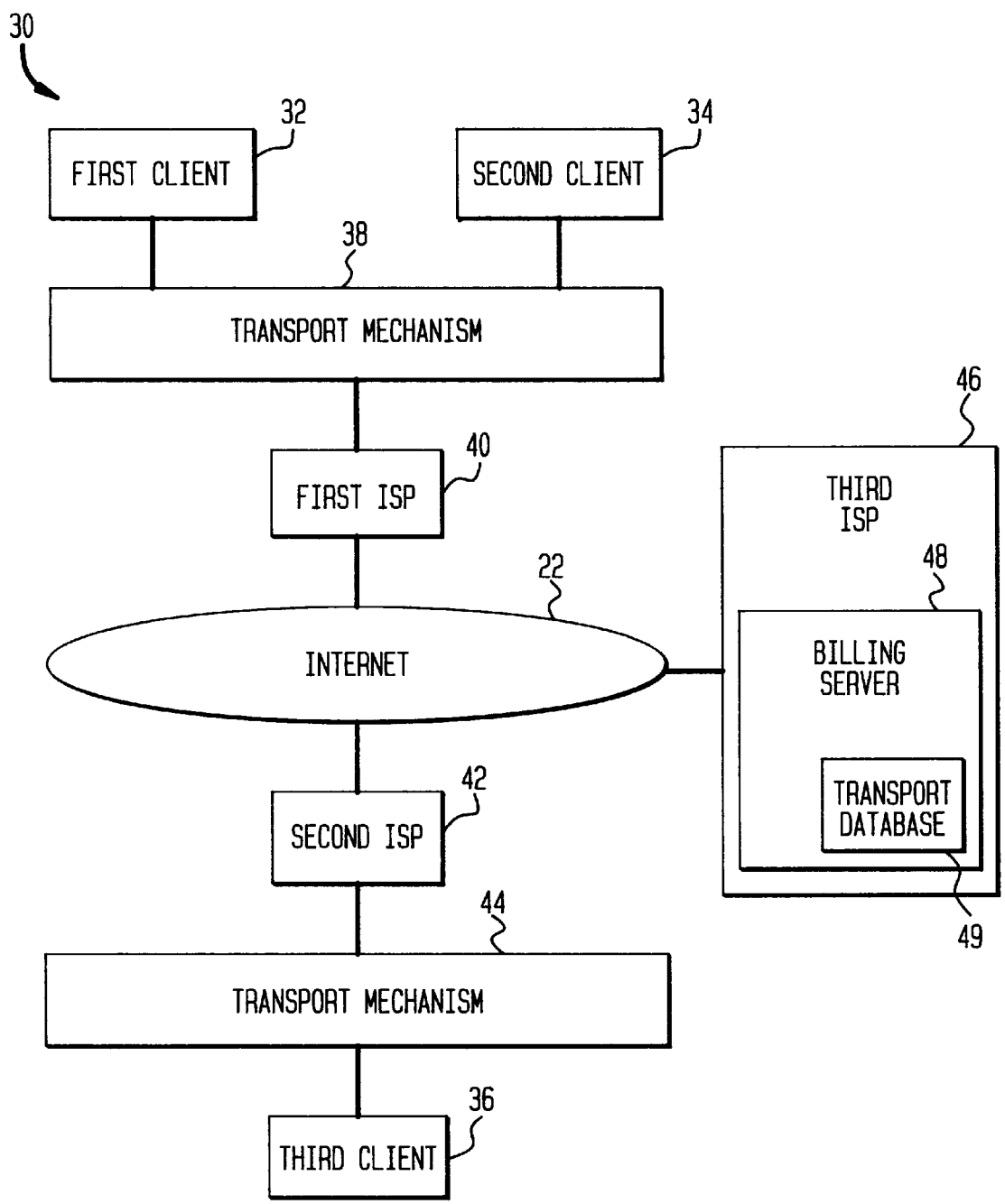
FIG. 2 is a functional model of a communication system including a billing server according to the teachings of the present invention.

FIG. 2 illustrates a communication system 30 in accordance with the present invention. The communication system 30 provides for purposes of illustration, communication between first, second, and third clients 32, 34 36, respectively. The communication system 30 provides a transport mechanism 38 between clients 32 and 34. The transport mechanism 32 may suitably consist of any of the options discussed above in connection with the transport mechanism 18. The communication system 30 also includes a first ISP 40 and a second ISP 42, which are used by the clients 32, 34 and 36 to provide access to the Internet 22. Communication system 30 also includes a transport mechanism 44. In addition, the communication system 30 includes a third ISP 46. The third ISP 46 includes a billing server 48, which communicates with the ISPs 40 and 42 through the Internet 22. The billing server 48 as shown in FIG. 2 includes an optional transport database 49 which may suitably be used to expand the function of the billing server 48 to support billing arrangements with transport companies should it be agreed that a user will pay for the transport leg of a call. With this option, the transport database 49 will store necessary data, such as the rates for various transport companies and types of calls. Finally, the billing server 48 is shown as part of the ISP 46, which none of clients 32, 34 and 36 employ as their ISP. It is presently preferred that the ISPs 40 and 42 pass information to, and receive services from clients under a contractual arrangement. It will be recognized, however, that the billing server 48 may also be implemented as part of an ISP, such as ISP 40 or ISP 42. When the billing server 48 is part of one of the ISPs involved in making a connection, processing of that connection is somewhat simplified. Conversely, greater costs may result as multiple billing servers are required.

By transferring information to the ISP 46, the ISPs 40 and 42 are able to receive billing services based on the types of connections established, and are able to bill their customers according to options previously selected by the customers. Because ISP 46 communicates with ISP 40 and 42 over the Internet 22, ISP 46 can be located anywhere and still be able to provide services to both ISP 40 and 42. While the ISP 46 is shown as providing billing services for two ISPs 40 and 42, it will be recognized that one billing server may provide billing services for a large network of ISPs.

Figure 3:
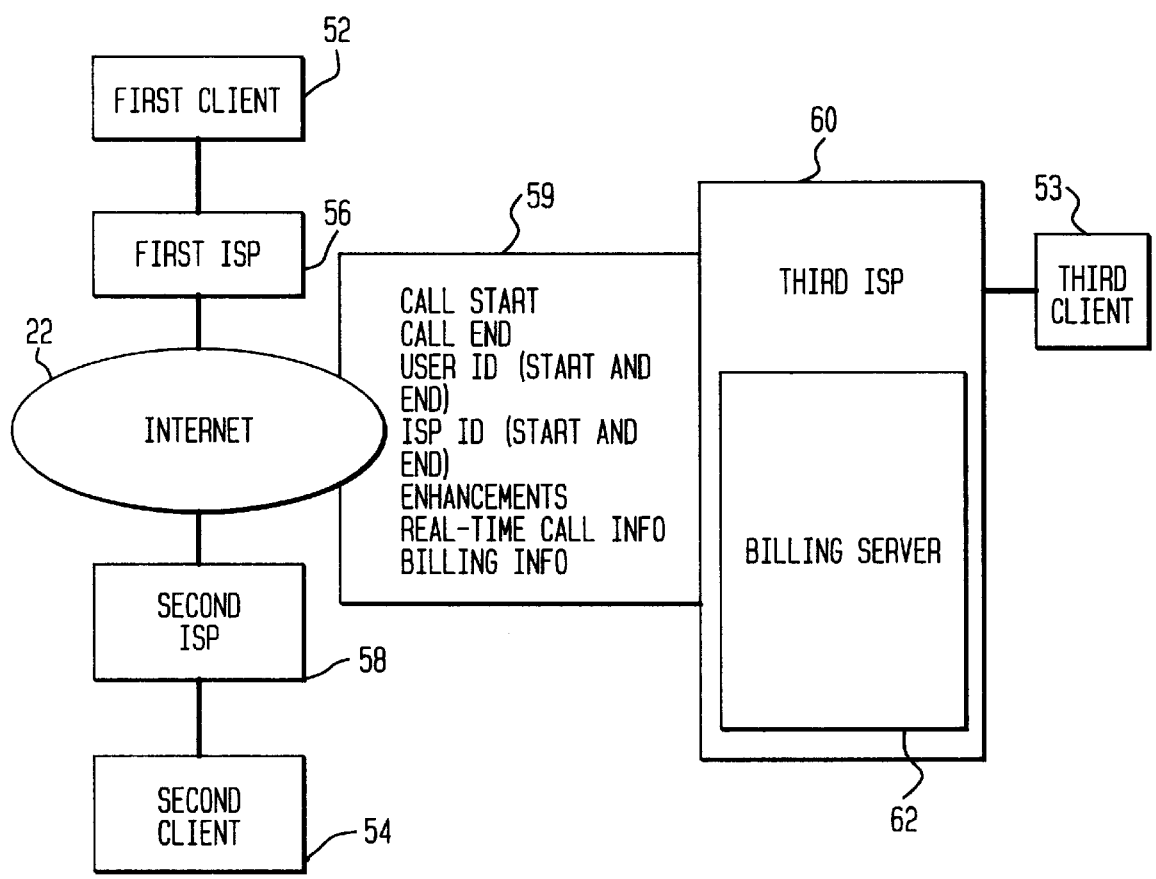
FIG. 3 is a diagram illustrating activity occurring during an Internet telephony call.

FIG. 3 illustrates details of the operation of a billing server 62 in accordance with the teachings of the present invention. FIG. 3. illustrates a first client 52 connecting to a second client 54 via first and second ISPs 56 and 58, respectively; By communicating with their respective ISPs 56 and 58, the clients 52 and 54 are able to establish a voice telephony connection and to make various choices about the connection. These choices include billing choices, such as whether the originator of the connection will pay, or whether the connection is to be a collect or 800-number equivalent or the like in which the called party will pay, quality of service choices, such as whether available voice enhancements or increased packet density will be used, and whether real-time billing information is to be displayed. ISPs 56 and 58 establish a connection via the Internet 22. One of the ISPs 56 or 58 or both transfers billing information to an ISP 60 and thence to a billing server 62, also via the Internet 22. As addressed in greater detail below, representative call, billing and enhancement details or information 59, such as call start, call end, user identification, ISP identification, available and client selected enhancements, real time call information and billing information, pass to and from ISPs 56 or 58 and the ISP 60.

As an illustrative example, when client 52 calls client 54, and client 52 will pay for the call, the client 52 first establishes a connection with ISP 56, which in turn establishes a connection with ISP 58, which then completes the connection with client 54. At this time, ISP 56 also furnishes data identifying the connection to the ISP 60, which hosts billing server 62. The ISPs 56 and 58 provide information to billing server 62 throughout the call. As different ISPs will typically have different billing rates, the call negotiation phase will preferably allow the paying party to approve the rate before proceeding with the call. For example, if the callee's ISPs' rate is very high, the caller might not want to pay, and may choose not to proceed with the call. Billing server 62 is preferably able to collect information in real time to use this information to provide enhanced billing services to users.

At the termination of the call, ISP 56 notifies billing server 62 that the call has been terminated. Alternatively, termination of call notification from both ISP 56 and 58 may be used as a validation mechanism. The billing server 62 logs the beginning and end of the call, and identifies the initiator of the call. At appropriate times, typically monthly, the ISP 60 exchanges information with ISP 56 and ISP 58. In the example discussed above, ISP 60 would provide information to ISP 58 enabling ISP 58 to credit its user's account for the duration of the call. Correspondingly, ISP 60 would provide information to ISP 56 enabling ISP 56 to debit its user's account for the duration of the call. It will be recognized that ISP 60 may provide billing information in whatever manner, and according to whatever schedule, is desired.

Billing server 62 is able to provide alternative billing options in a similar manner. For example, in the case of a collect call from client 52 to client 54, the billing server 62 will instruct ISP 56 to credit its user's account for the call and will instruct ISP 58 to debit its user's account.

ISP 60 is also able to provide billing services involving calls to or from its own users. When a calling or called party is a user of the ISP 60, the process is much the same, with less communication between Internet Service Providers being required, since ISP 60 can communicate directly with its own billing server 62.

Figure 4:
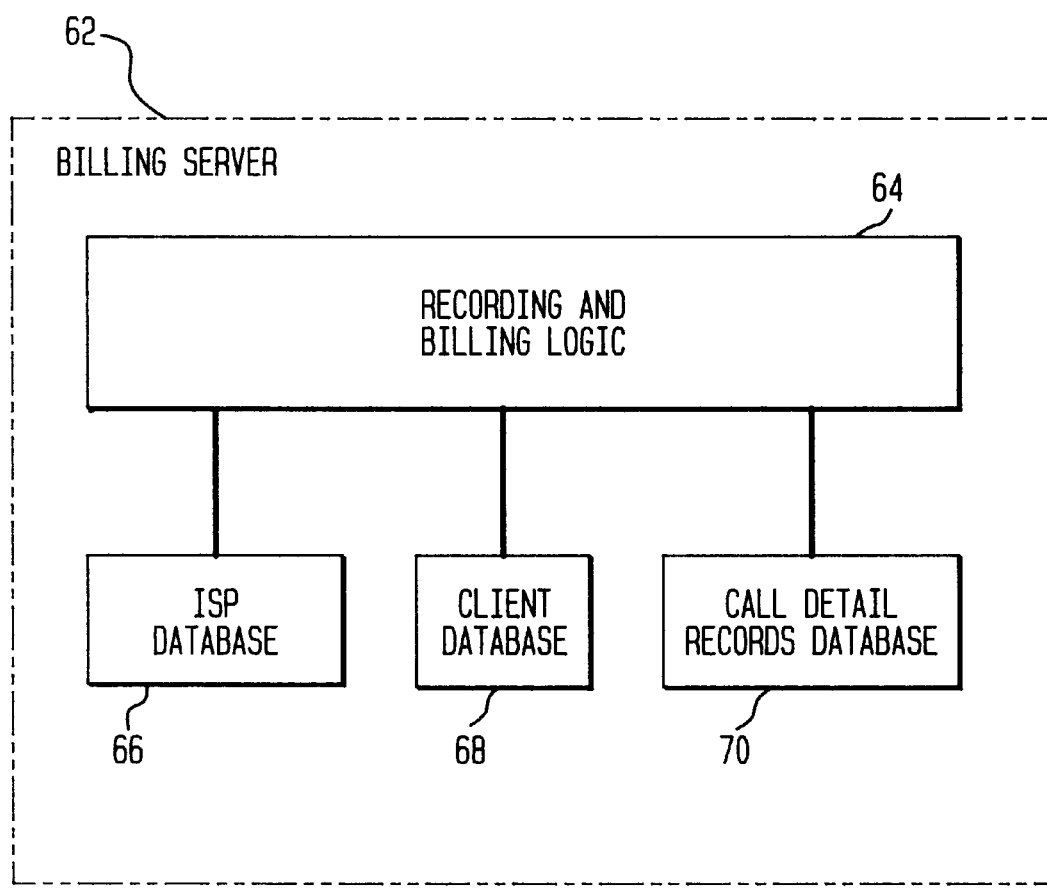
FIG. 4 is a more detailed illustration of a billing server according to the teachings of the present invention.

FIG. 4 provides a more detailed illustration of one embodiment of the billing server 62. As shown, billing server 62 includes recording and billing logic 64, an ISP database 66, a call detail records database 70, and a client database 68. Billing server 62 receives call detail information from an ISP, such as ISP 56. The call detail information preferably includes ISP and customer identification, the beginning time of the call, the setup parameters of the call, and whatever other relevant information is desired. The call detail information is processed by recording and billing logic 64, which looks up the ISP and client information in the ISP database 66 and the customer database 70. During the call, billing server 62 receives periodic updated call details, which may include packet routing and density. If display of real-time billing information has been selected, the billing server 62 transmits the desired information in the form of digital packets to the originating and terminating ISPs, which pass it on to their clients. When the call terminates, the billing server 62 receives a terminating call detail containing the terminating time of the call. Once the call is complete, a call billing record is stored in the call detail records database 70. Billing server 60 then makes this record available to billing systems, external databases, or other client processes as desired.

By using a billing server such as the billing server 62, a service provider can gather and process information about Internet calls which was previously unavailable, and can provide billing services which cannot be provided with the present state of the art of conventional voice telephony. Because of the nature of Internet telephony and Internet communication in general, the information packets transmitting the call also carry information about the call. This information can be readily extracted from the packets and used to provide continuously updated, real-time information at the request of the user. This information can include, for example, the packet path displayed as nodes and lines on a geographic map, the duration of the call which may be continuously updated, if desired, the packet density or the packets per unit time used for the call, available voice enhancements or alterations, and which available voice enhancements or alterations are actually used. A user may view his or her call detail records in real time during a call, or at any time by contacting the billing server. Billing servers according to the teaching of the present invention can accommodate different per-minute rates for different packet densities and for enhanced voice quality, and can provide variable billing according to the level of service used, the time of day, or the like.

FIG. 5 is a flowchart showing one suitable method 500 of operation for a billing server according to the teachings of the present invention. In step 502, a call is initiated and the call setup information is received by a billing server, such as the billing server 62. This call setup information preferably includes the origin and destination of the call, the billing choices made, such as originator billing, collect or third-party billing, or other options, and selected enhancements. At step 504, the billing server identifies the terminal ISPs and users by querying its databases. At step 506, the billing server stores the call setup information, for example, in a memory or database such as the database 70. At step 508, the billing server examines the call setup information to determine if any enhanced features are selected which require a real-time or delayed display to the user. If a display is selected, step 510 is executed and the billing server periodically transmits the appropriate information to the appropriate address for the duration of the call. At the user's location, such as at the client 52, the information may be displayed on a display, such as the typical computer CRT display.

Otherwise, control is passed directly to step 512. At step 512, the billing server receives notification of the end of the call. Next, in step 514, the billing server creates and logs a detail of the call, containing all the appropriate information, such as the originating and terminating users, originating and terminating ISPs, call start, call termination, and any enhanced information such as call routing, packet density, and voice enhancements. Finally, in step 516, the billing server periodically furnishes billing information to the customer ISPs. This is typically done on a monthly cycle but may be done on any desired schedule.

While the present invention is disclosed in the context of a presently preferred embodiment, it will be recognized that a wide variety of implementations may be employed by persons of ordinary skill in the art consistent with the above discussion and the claims which follow below.

We claim:

1. A billing server for processing and maintaining billing information for Internet telephony connections, comprising:

a receiver for receiving digital packets containing information describing an Internet telephony connection;

an Internet Service Provider ("ISP") database for storing an index of ISPs, each of said ISPs being associated with an ISP identifier;

a client database for storing an index of clients, each of said clients having an associated client identifier;

a billing record database adapted to store billing information relating to said Internet telephony connections; and a processor for:
extracting, from said packets, relevant billing information from said Internet telephony connections,
extracting, from said packets, source and destination ISP identifiers of said packets,
looking up said source and destination ISP identifiers in said ISP database and identifying said source and destination ISP's from said source and destination ISP identifiers,
extracting, from said packets, client identifiers,
looking up said client identifiers in said client database, identifying said clients from said client identifiers, and
constructing a billing record using said relevant billing information, source and destination ISP identifiers, and client identifiers.

2. The billing server of claim 1, further comprising a database for storing a plurality of additional billing records.

3. The billing server of claim 2 wherein said relevant billing information comprises a start and end time of said Internet telephony connection.

4. The billing server of claim 3 wherein said relevant billing information further comprises identification of a use in selection of an enhanced service.

5. The billing server of claim 4 further comprising a transmitter for transmitting real-time billing information to client devices.

6. The billing server of claim 5 wherein said real-time billing information includes an elapsed time of a connection.

7. The billing server of claim 6 wherein said real-time billing information includes a cumulative cost of a connection.

8. The billing server of claim 7 wherein said real-time billing information includes information suitable to provide a display of geographic routing of a connection.

9. The billing server of claim 8 wherein said real-time billing information includes information suitable to provide a display of packet density of a connection.

10. A method of billing for Internet voice telephony connections between two or more clients, comprising the steps of:
receiving notification of initiation of an Internet voice connection;
receiving digital packets containing connection information relating to said connection;
extracting, from said packets, Internet Service Provider ("ISP") codes associated with originating and terminating ISPs for said connection;
extracting, from said packets, user codes associated with originating and terminating clients for said connection;
using said ISP codes to identify said originating and terminating ISPs for said connection;
using said user codes to identify said originating and terminating users for said connection;
receiving notification of termination of said connection; and
constructing a call detail using said connection information and said identifications of originating and terminating ISPs and clients.

11. The method of claim 10 further comprising the step of storing said call detail.

12. The method of claim 11 further comprising the step of using said stored call details to construct a billing record.

13. The method of claim 12 wherein said billing record comprises a record of all Internet telephony connections originating from or terminating at a particular ISP during a specific time period.

14. The method of claim 13 further comprising the step of transmitting said billing record to an associated ISP.

15. The method of claim 14 further comprising the step of transmitting billing information to said originating and terminating clients during said connection.

16. A billing server for processing and maintaining information for Internet telephony connections, said connections being implemented through the transmission of digital packets between clients of one or more Internet Service Providers ("ISPs") connected to an Internet, said digital packets being transmitted from one ISP to another via the Internet, said billing server comprising:

a receiver for receiving digital packets from one or more ISPs, said packets containing information defining a beginning and termination in time of an Internet telephony connection, said packets further containing ISP identifiers, said ISP identifiers being associated with an originating and terminating ISP of said Internet telephony connection, said packet further containing client identifiers associated with an originating and terminating client of said Internet telephony connection, said packets further containing information identifying selected enhancements and features of said Internet telephony connection;

an ISP database for associating each of said ISPs with each of said ISP identifiers;

a client database for associating each of said clients with each of said client identifiers;

a billing record database for storing records associated with each of said Internet telephony connections;

a processor for identifying said originating and terminating ISPs and said originating and terminating clients by referring to said associated ISP and client identifiers in said ISP and client databases, constructing a billing detail for each of said connections, said billing detail identifying said originating and terminating clients and ISPs and said beginning and terminating time for each of said connections, said billing detail also identifying use of said selected enhancements and features of said connections, storing each of said billing details in said billing records database, assembling for each of said originating and terminating ISP's a billing record, said billing record comprising all of said billing details for Internet telephony connections associated with said ISP during a selected time period, and storing each of said billing records in said billing records database; and a transmitter for transmitting connection information to each of said clients during each of said connections and for periodically transmitting said billing records to each of said ISPs.

* * * * *